United States Patent [19]

Ahrweiler

[11] 4,029,456

[45] June 14, 1977

[54] RAPID LOAD-RELIEVE DEVICE FOR CONTINUOUS PRESS

[75] Inventor: Karl-Heinz Ahrweiler, Krefeld, Germany

[73] Assignee: Eduard Kusters Maschinenfabrik, Krefeld, Germany

[22] Filed: Oct. 10, 1975

[21] Appl. No.: 621,382

[30] Foreign Application Priority Data

Oct. 31, 1974 Germany .......................... 2451894

[52] U.S. Cl. .................................. 425/149; 100/53; 100/154; 100/50; 425/154; 425/371; 425/406

[51] Int. Cl.[2] ........................................... B29C 3/06

[58] Field of Search .......... 425/149, 154, 406, 371; 100/53, 52, 153, 50, 154

[56] References Cited

UNITED STATES PATENTS

| | | | |
|---|---|---|---|
| 2,389,169 | 11/1945 | Stacy | 425/149 |
| 3,680,476 | 8/1972 | Pfeiffer | 100/53 X |
| 3,719,445 | 3/1973 | Sindelar | 425/154 X |
| 3,748,225 | 7/1973 | Busker et al. | 100/154 X |
| 3,808,092 | 4/1974 | Busker | 100/154 X |
| 3,851,685 | 12/1974 | Ahrweiler et al. | 425/371 X |
| 3,890,413 | 6/1975 | Peterson | 425/149 X |

*Primary Examiner*—Robert L. Spicer, Jr.
*Attorney, Agent, or Firm*—Kenyon & Kenyon Reilly Carr & Chapin

[57] ABSTRACT

A rapid load relief device to prevent fast build-up of pressure in a continuous press of the type having two rotatively driven endless conveyor belts forming opposed, substantially linear spans defining a press zone with press platens applying pressure through the travelling spans to work carried therebetween and in which a plurality of hydraulic cylinders or spindles are inserted between the press platens and rigid supports with pressure supplied to the cylinders through a pressure-controlling valve which is sensitive to the movement of the pressure platen to regulate the pressure in the cylinders maintaining a constant platen spacing in which means are provided which, upon sensing an excess pressure, immediately separate the press platens.

10 Claims, 2 Drawing Figures

RAPID LOAD-RELIEVE DEVICE FOR CONTINUOUS PRESS

BACKGROUND OF THE INVENTION

This invention relates to presses of the type wherein two pressure platens are each supported by a support construction so that the forces of each of the press platens are transmitted to their corresponding support construction and in which means are provided to regulate spacing of the press platens including pressure elements positioned between the platens and respective support construction in general, and more particularly, to a rapid pressure release device for such a press which prevents excessive pressures building up therein.

A press of this general nature is disclosed in U.S. Pat. No. 3,851,658, the disclosure of which is hereby incorporated by reference. Means for maintaining constant spacing in such a press are described in detail in U.S. Pat. No. 3,881,852, which is also hereby incorporated by reference. The press disclosed in these references is a continuous press for the manufacture of wood, chipped wood or the like, in which the material to be treated is moved continuously between two flexible endless conveyor belt spans. Between the belt span forming the press zone and the press platens, a plurality of rotatively unpowered endless loops of roller chains are used, these roller chains are used, these roller chains being packed transversely together to form a bed interposed between the platens and the seal strip conveyor belts. The press platens in turn are positioned between support constructions comprising beams, each position transversely to the movement of the belts with portions of such beams extending longitudinally above and below the press platens for the length of a press.

Hydraulic pressure cushions or hydraulic cylinders are interposed between the beam and pressure platen to control pressure and maintain the proper spacing. In the second of the above-mentioned references, means for controlling this spacing in the form of a guiding valve arranged so that when the distance between the press platens is at a pre-determined spacing, the valve is inactive and is closed. A pressure pump coupled through the valve causes an increase in the pressure in the pressure elements until the press platens begin to move together changing their position. At that point, the guide valve opens to allow a bleed off of hydraulic fluid relieving the pressure so that the press platen moves back in a direction to cause it again to be at the pre-determined distance, where upon reaching the pre-determined distance, the valve becomes inactive. Through this arrangement, a dynamic balance about the pre-determined distance between the platens is achieved. Such a design works quite well. However, if the material being compressed for some reason present to the press a greater resistance to compression than is normal, the pressure in the pressure elements increases.

As is well known, presses of this nature are used for the continuous or discontinuous production of panel materials. With many materials of this nature, during formation of the panel, a chemical process occurs with which is associated the development of gases, or in any case a tendency for an increase in volume. For example, such occurs when producing panels of a foam substance. In such processes production speed can be increased through the use of heat. However, at the same time, the process generates heat. Thus, the situation can arise where the temperature within the mass of the material rises too fast, accelerating the process and generating still more heat and further acceleration of the process. Such may lead to an explosive rise in pressure which may burst the entire press mechanism.

In view of the possibility of such occurring, the need for a safety device which can rapidly relieve pressure if the process gets out of hand and the pressure rises abruptly to prevent further pressure increases becomes evident. Such a device is needed if safe operation at high production speeds is to take place.

SUMMARY OF THE INVENTION

The present invention provides a solution to this problem. In essence, it provides means which, upon sensing an excess pressure, immediately separate the press platens in the apparatus to quickly relieve the pressure. In other words, the press platens are driven in a direction opposite from that in which they are normally driven to press the material.

The apparatus of the present invention is arranged such that, as soon as the pressure developed in the material being pressed exceeds the pre-determined maximum operating pressure and the pressure platens begin the move apart, the rapid pressure release device responds to actively drive the pressure platens apart, preventing any further build-up of pressure in the material being processed.

Although it is within the scope of the present invention to accomplish these objects through the use of supplementary elements for driving the press platens apart, it is preferred that double-acting force elements capable of both forcing the platens together and drawing them apart be used. Of particular advantage is a piston cylinder unit operated by a hydraulic medium which can be used both for sensing over-pressures and for driving the plates apart. In such a device, the only difference in operation between the two modes is that, when excess pressure occurs, the operating direction of the elements exerting force is reversed. In the illustrated embodiment, a device for rapidly relieving the load including a pressure relief system which accomplishes its sensing by using a portion of the piston cylinder arrangement. In particular, the piston is made with a stop defining an enclosed small space on the side of this piston opposite that to which the hydraulic fluid is supplied for pressing purposes. In a manner to be more fully described below, this permits sensing a small movement of the piston away from its normal operating position due to excess pressure whereupon the necessary action can be taken. This is a hydraulic system separate from the normal system supplying hydraulic pressure to the press and comes into play only in the case of overload.

Preferably, the device for rapidly relieving the load includes means for storing or accumulating hydraulic fluid under pressure so that the necessary fast action in driving the platens apart can take place. This is necessary so that there will not be a detrimental hydraulic pressure drop at the time the system comes into action as would be the case if a pump of limited capacity were used alone. In the present system, the drive means operate until they reach a stop defining the desired spacing between press platens. Typically, these comprise a plurality of piston and cylinder arrangements. The hydraulic fluid supplied to these cylinders is supplied at a pressure defining the desired maximum pressure. It is preferable that in this type of system, the sensing of an overpressure be done by sensing the movement of the piston away from its stop position. In general terms, the present invention is preferably practiced by using a device sensing the movement of the force exerting element from its stop point. Preferably in the type of system just described, this is a pressure controlled system which will exhibit a pressure change which is easily detectible as soon as the force transmitting element moves away from the stop. Furthermore, this sensing system preferably drives suitable valves for connecting the rapid load relief device to force the platens apart and at the same time disconnecting the normal force transmitting system.

Where the preferred piston and cylinder unit is used for transmitting this force, the stop is formed by an enclosed member at the top of the piston. This member, preferably of annular shape, is at the side of the piston opposite that to which the hydraulic fluid for normal pressing is supplied. This annular portion abuts against the top of the cylinder and defines an enclosed zone. In accordance with the preferred embodiment of the present invention, the sensing system is a hydraulic system coupled into this enclosed zone. As long as the piston remains at its stop nothing happens. However, as soon as the piston moves away from the stop, hydraulic fluid can flow out of the enclosed space over the full top of the piston and a significant pressure drop occurs. It is this pressure drop which is detected and used to initiate the present quick relief system. Although the stop of the present invention is in the form of an annular web at the end of the piston, it will be recognized that other equivalent arrangements can be used.

DETAILED DESCRIPTION OF THE PREFERRED EMBODIMENT

Figure 1:
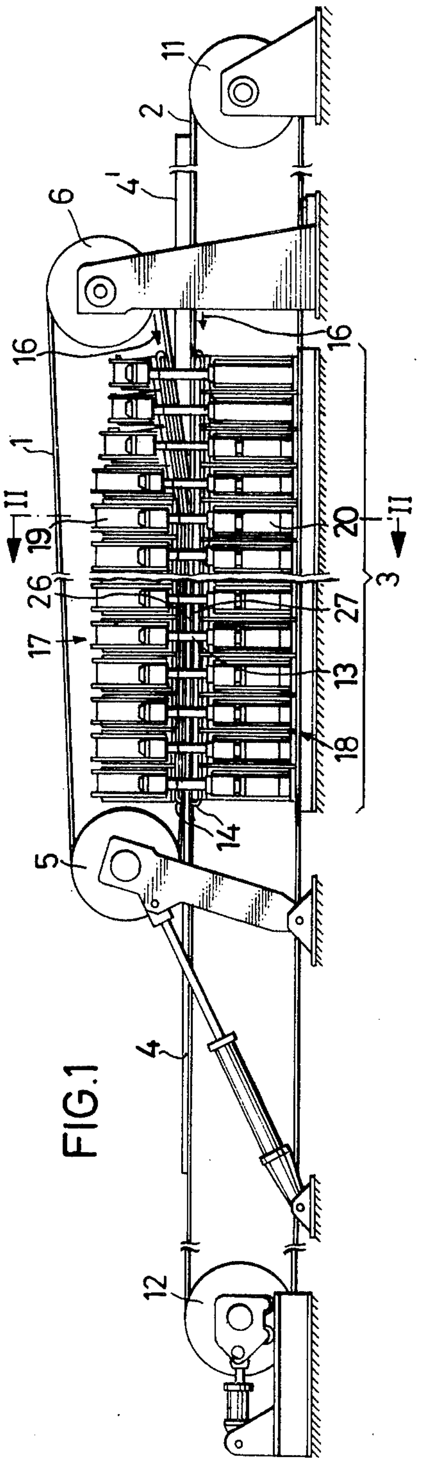
FIG. 1 is a side elevation view of a press in which the present invention is employed.

FIG. 1 shows the upper and lower endless conveyor belt loops 1 and 2 respectively, which form opposed, substantially linear spans defining the pressing zone embraced by the bracket 3. These belts are made of thin strip steel having a thickness of about 1 to 1.5 mm. and are flexible both longitudinally and transversely. The upper belt 1 is looped around rotative drums 5 and 6. The lower belt 2 at one end loops around a rotative drum 11 with the other end of this lower loop passing around a rotative drum 12.

The work 4 enters at the right hand end of the press in FIG. 1 as loose material 4′ and comes out the left hand end with a reduced thickness.

The working spans of the two belts in the zone 3 are pressed together by press platens 27 and 26, the lower platen 27 being held against downward motion by individual supports such as transverse I-beams 20 supported by base members which extend longitudinally for the length of the press. The upper platen 26 is supported by individual supports such as transverse I-beams 19 which can be pulled downwardly by suitable actuators. There are a plurality, or series, of these beams 20 and 19 and each of the upper beams 19 is provided with its own pair of actuators 21. The upper beams 19 form an upper support structure 17 and the lower beam 20 a lower support structure 18.

The platens 26 and 27 each extend for the full length of the pressing zone 3 as one-piece constructions, excepting that, as suggested in FIG. 1, the upper one may be in two sections to define a converging entrance zone for the work so that the latter can receive a gradually increasing pressure as it initially enters the press.

Roller chain loops providing the anti-friction means between these platens and the steel strip conveyor belt spans throughout the pressing zone 3, are generally indicated in FIG. 1 as the roller chains extending between the lower belt 2 and the lower platen 27 and being individually looped by individual looping sprocket wheels approximately positioned and which are unpowered and rotatively freed from one another. It can be seen that these roller chain loops 14, encircle both the lower platen 27 and its supporting beams 20. By lengthening the upper belt loop 1, the same arrangement could be used for the upper roller chain loops 14 which must run between the upper belt loop and the upper platen 26.

This is an arrangement more fully described in U.S. Pat. Nos. 3,851,685 and 3,881,852. As described therein, pressure and, if desired, heat is transmitted through the roller chains 14 and the conveyors 1 and 2 to the strip of material 4.

Figure 2:
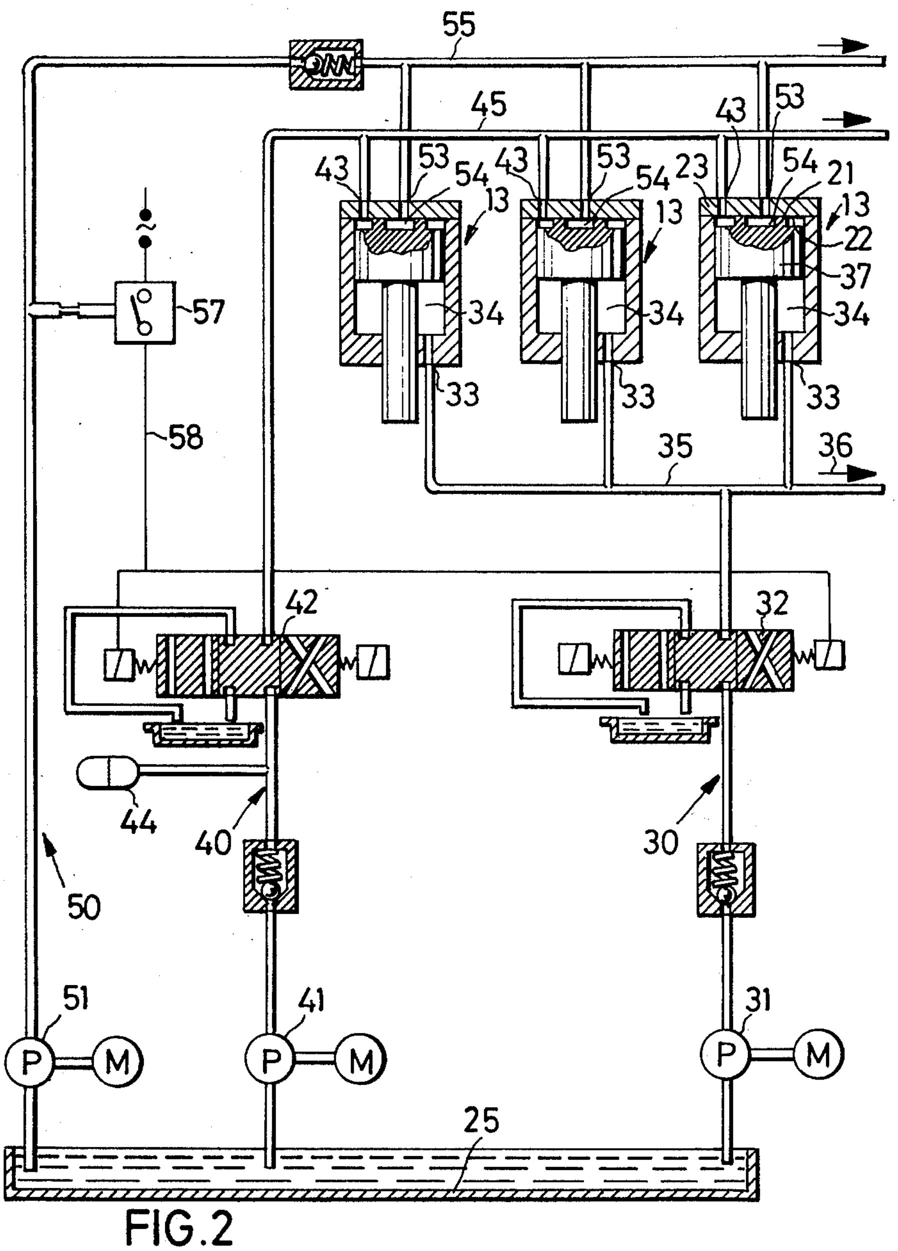
FIG. 2 is a schematic diagram of the quick relief system of the present invention.

The system of the present invention which allows rapid pressure relief in the press of FIG. 1 is shown in schematic form on FIG. 2. The pressure transmitting members 13 of FIG. 1 are shown as piston and cylinder units including a cylinder with a chamber 34 containing a piston 37. Preferably, these elements exert a pulling action, i.e., they pull the support structures together thereby compressing the work material between the press platens. In normal operation, a pump 31 driven by a motor supplies hydraulic fluid through a three-way valve 32 to a manifold 35 from which individual lines are provided to the inlets 33 of the respective cylinders of the force exerting elements 13. This first pressure loop designated 30 is the normal operating system. The pressure in the system is designed to drive the pistons fully to their limit at the top of the cylinder to establish a predetermined spacing between press platens. In addition, this pressure in the system is maintained such that should it be exceeded, the pistons would begin to move downward in the cylinders. However, it will be recognized by those skilled in the art that rapid pressure relief is not possible in this manner. Furthermore, although only three elements 13 are shown on the figure, it will be recognized, that as indicated by arrow 36, a plurality of additional elements will be supplied, i.e., all the elements shown on FIG. 1 and which are located on both sides of the press must be supplied.

Each of the pistons 37 contains an annular projecting sealing web 21, coaxial with the piston and formed in the top thereof. This annular web abuts against the top of the cylinder when the piston is fully translated to its operating position. In other words it forms a stop determining the stroke of the piston and establishes the proper operating position to obtain the desired thickness of the strip 4. The enclosed space formed between the annular web 21 and the top of the piston and designated 54 on the figure is utilized to carry out sensing of an over pressure in the apparatus. Shown on the figure is a second hydraulic pump 51 driven by a motor in conventional fashion. Pump 51 like pump 31 and pump 41 to be described below all draw hydraulic fluid from a common sump 25. Fluid from the pump 51 is supplied to inlets 53 in the top of each cylinder leading to the spaces 54. Also coupled to the line 55 leading to each of the cylinders is a pressure sensitive switch 57.

The third illustrated hydraulic system is designated generally as 40. It includes a pump 41 driven by an electric motor supplying its output through a three-way valve 42 to a line 45 coupled to inlets 43 at the top of each of the cylinders in the space outside that defined by the annular web 21. Between the valve 42 and pump 41 is a pressure accumulator 44, for example, a tank initially filled with air into which hydraulic fluid is pumped, compressing that air so that when the valve 42 is opened, sufficient pressure is available to quickly supply large amounts of hydraulic fluid to the units 13. Valves 42 and 32 are solenoid valves which are coupled to the pressure switch 57 over line 58. In normal operation the valve 32 is open coupling pump 31 to line 35 and the valve 42 closed. Switch 57 is held in a normally open position by a pre-determined pressure existing in the line 55. This pressure is present in the spaces 54 at the tops of the piston. This pressure is selected to be lower than that applied to the bottom of the pistons by the system 30. Furthermore, it works on a much smaller area and thus does not appreciably act to force the pistons downward. The pressure in the system 30 is adjusted to balance out this pressure. The pump 41 is operated to charge the accumulator 44 with sufficient hydraulic fluid at the desired pressure.

If an overpressure occurs within the press due to a reaction proceeding faster than it should, the pistons 37 will be moved downward since this pressure will now exceed the hydraulic pressure in the cylinders 34. As soon as a small movement occurs, the hydraulic fluid in the spaces 54 and in the line 55 can flow outside the space over the full top of the piston. This will result in an immediate pressure drop which will be sensed by the pressure sensitive switch 57 closing that switch. The closure of the switch activates the solenoid valves 32 and 42 opening the valve 32 to permit the hydraulic fluid in the bottom of the cylinders 34 to be discharged to a sump and closing the valve 42 to permit the accumulator 44 and pump 41 to be coupled over line 45 to the inlets 43 at the top of the cylinders. This will cause sufficient quantities of hydraulic fluid at sufficient pressure to be available to immediately force the pistons downward, quickly separating the press platens with the fluid in the bottom of the cylinders being forced out through the line 35 and valve 32 into the sump. The use of the three-way valve in connection with the hydraulic system 30 means that the pressure in the system 40 does not have to overcome the normal operating pressure of the system and thus makes a quick action, separating the press platens easier.

Thus, an improved safety device for a press has been shown. Although a specific embodiment has been illustrated and described, it will be obvious to those skilled in the art that various modifications may be made without departing from the spirit of the invention which is intended to be limited solely by the appended claims.

I claim:

1. In a press having two press platens which are brought toward each other by at least one force exerting element utilizing a fluid medium under pressure, the elements designed to abut against a stop as long as a pre-determined operating pressure between the spans is not exceeded, the improvement comprising:

a. means for sensing the movement of the force exerting element away from the stop and providing an output indicative thereof; and b. means responsive to the output of said sensing means for moving said press platens apart in a direction opposite to their normal operating direction.

2. A press according to claim 1 wherein said force exerting element is a double-acting force exerting element and wherein said means for moving apart said press platens comprises means for operating said force exerting element in a direction opposite to its normal operating direction.

3. Apparatus according to claim 2 wherein said double-acting element is a piston and cylinder unit actuated by a medium under pressure.

4. Apparatus according to claim 3 wherein said means for sensing comprises means arranged to have a drop in pressure when the piston and cylinder of said force exerting element move apart from a stop position and means responsive thereto for applying a fluid pressure to the side of said piston opposite the side to which its normal operating pressure is applied.

5. Apparatus according to claim 4 wherein said means for applying pressure to the opposite side of said piston includes a fluid pressure accumulator.

6. Apparatus according to claim 5 wherein said means for supplying said pressure to the other side of said cylinder includes a valve for coupling said pressure accumulator to the other side of said piston and wherein said valve is operated by said means sensing a drop in pressure.

7. Apparatus according to claim 6 wherein said piston has a stop comprising a sealing web at one end defining an enclosed space at the top of the cylinder when said piston is in abutment therewith and wherein said means for sensing a drop in pressure comprises means for supplying pressure to said closed space and means for sensing a drop in pressure in said space caused by said piston moving away from the top of said cylinder.

8. Apparatus according to claim 7 wherein said sealing web has an annular shape.

9. Apparatus according to claim 1 and further including a stop limiting the spacing of said press platens.

10. Apparatus according to claim 6 and further including a second valve responsive to the output of said sensing means for disconnecting said cylinders and pistons from their normal source of operating fluid.

* * * * *